G. H. TRIPPLEHORN.
SHOCK ABSORBER.
APPLICATION FILED AUG. 2, 1920.
1,428,306.
Patented Sept. 5, 1922.
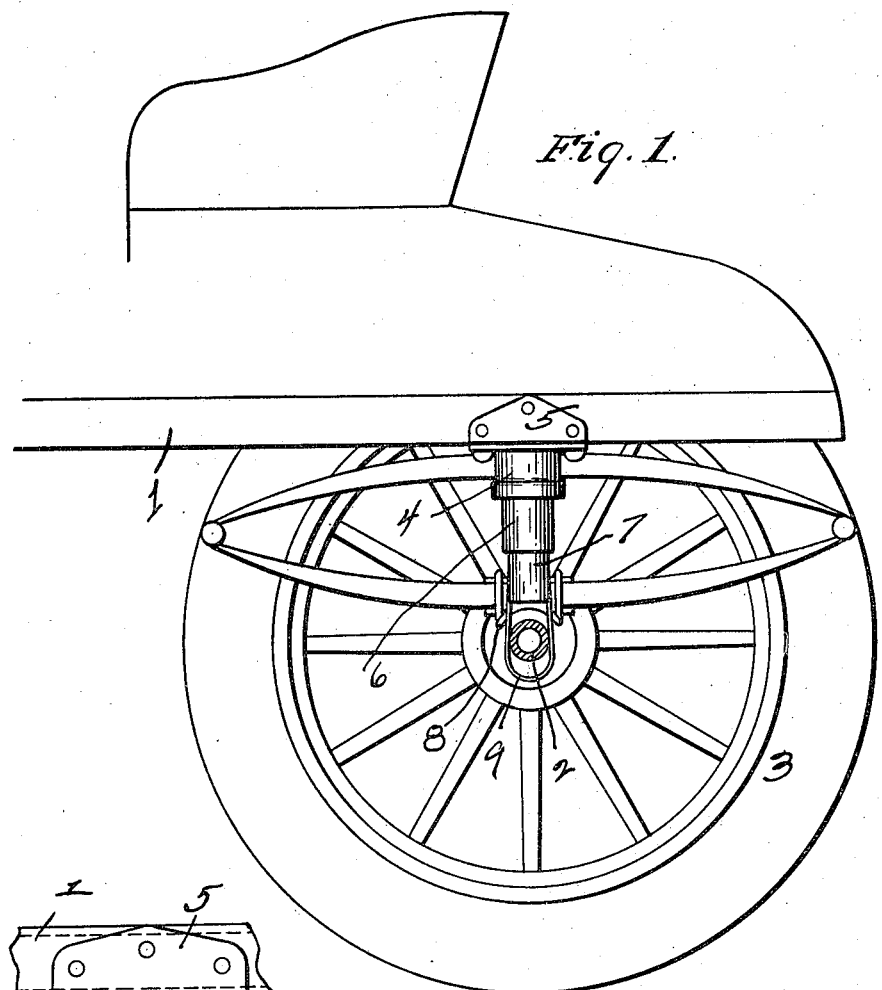
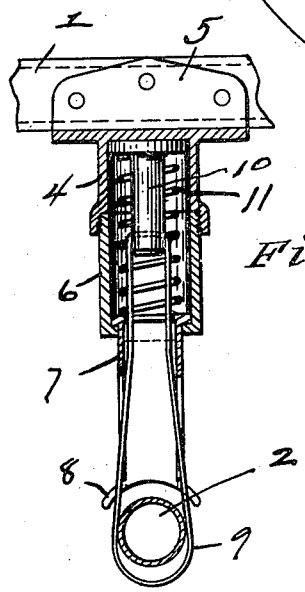
Inventor
GEORGE H. TRIPPLEHORN
By Charles E. Wiser
Attorney Patented Sept. 5, 1922.

1,428,306

UNITED STATES PATENT OFFICE.

GEORGE H. TRIPPLEHORN, OF HIGHLAND PARK, MICHIGAN.

SHOCK ABSORBER.

Application filed August 2, 1920. Serial No. 400,569.

*To all whom it may concern:*

Be it known that I, GEORGE H. TRIPPLE-HORN, a citizen of the United States, residing at Highland Park, county of Wayne State of Michigan, have invented a certain new and useful Improvement in Shock Absorbers, and declare the following to be a full, clear, and exact description of the same, such as will enable others skilled in the art to which it pertains to make and use the same, reference being had to the accompanying drawings, which form a part of this specification.

This invention relates to shock absorbers and the object of the invention is to provide a shock absorber adapted more particularly for use with vehicles to resist excessive upward or downward movement of the vehicle axle in relation to the body. A further object of the invention is to provide a telescopic shock absorber adapted to be secured to the vehicle frame at the upper end and having a foot engaging over the axle and a strap engaging beneath the axle whereby increasing upward or downward movement of the axle is increasingly resisted. A still further object of the invention is to provide a telescopic shock absorber containing a coiled spring adapted to be compressed by either upward or downward movement of the vehicle axle. Another object of the invention is to provide a shock absorber which aids greatly in preventing breakage of the usual leaf springs, of a vehicle and which, should breakage of the leaf springs occur, will still provide a spring support for the vehicle. These objects and the several novel features of the invention are hereinafter more fully described and claimed and the preferred form of construction by which these objects are attained is shown in the accompanying drawings in which—

Fig. 1 is a side view of the rear end of a vehicle with the outer wheel removed showing a shock absorber embodying my invention.

Fig. 2 is an enlarged section through the shock absorber.

The vehicle is provided with a frame member 1 usually formed of a steel channel and also with an axle 2 to which the wheels are secured and on which is mounted a pneumatic tire 3. The shock absorber consists of a cylindrical member 4 open at the lower end and formed integrally therewith is a bracket 5 adapted to be bolted to the frame member 1 as shown. The member 4 is flared outwardly at the lower end and a tubular member 6 is threaded into this flared portion of the member 4, as shown in Fig. 2, the inner walls of the members 4 and 6 providing a continuous chamber of the same diameter. The member 6 is provided with an internal flange at its lower end fitting the tubular piston 7 which is provided with an external flange at its upper end fitting the inner wall of the chamber 6. In this manner the member 7 is prevented from removal from the member 6 and the member 7 is provided with an outwardly flared arcuate foot 8 which is adapted to engage the shaft 2 of the vehicle upon upward movement thereof. The member 7 is slotted upon opposite sides, as shown in Fig. 2, through which a strap 9 is passed, the strap 9 extending downwardly around and beneath the shaft 2 and being passed through an aperture in the shank of the plunger 10, the tubular piston 7 being open at its upper end to allow the strap 9 to pass therethrough. It is to be noted that the upper edge of the tubular piston 7 is of sufficient width to support the spring 11, the open upper end of the member 7 being considerably less in diameter than the inner diameter of the spring 11. The head of the plunger 10 fits the inner faces of the members 4 and 6 and is supported on the upper end of the member 7 by the spring 11 which normally holds the plunger 10 in the position shown in Fig. 2. It is to be noted that the member 4 is not secured directly beneath the frame member 1 but is secured at one side thereof so as not to interfere with the leaf spring which is usually secured to the under side of the framework.

In operation the shock absorber takes the position shown in Fig. 2 so that neither the foot 8 or the strap 9 engage the axle 2. Upon upward movement of the axle the tubular piston 7 is moved upwardly in the tubular member 6 thereby compressing the coiled spring 11 and as the axle 2 is further moved upwardly the movement thereof is increasingly resisted by the said coiled spring. When the upward movement of the axle 2 has been stopped the axle will rebound downwardly and engage the strap 9 at which time the member 7 will be moved to its lowermost position by action of the spring 11 and the plunger 10 will be moved downwardly by the strap 9 and compress the spring 11 from the opposite end, the downward movement of the axle being increasingly resisted by the coiled spring 11. Should the leaf spring become broken the frame member 1 will drop until the foot 8 engages the shaft 2 at which time the vehicle body will be supported on the coiled spring 11, the coiled spring resisting upward or downward movement of the axle even when the leaf spring is broken. It is to be noted that this shock absorber aids greatly in preventing spring breakage, the shock absorber preventing extreme breaking shocks from being imparted to the leaf spring.

From the foregoing description it becomes evident that the device is very simple and efficient in operation, of cheap construction and low manufacturing cost and provides a shock absorber which accomplishes the objects desired.

Having thus fully described my invention, its utility and mode of operation, what I claim and desire to secure by Letters Patent of the United States is—

1. In a shock absorber for use between a vehicle frame and axle, a bracket secured to the vehicle frame, a cylindrical member formed integrally therewith and threaded on its inner face, a tubular member threaded therein and having an internal flange at its lower end, a tubular piston reciprocably mounted in the said tubular member and having an external flange at its upper end fitting the inner face of the said tubular member, a foot on the said piston adapted to be engaged by upward movement of the vehicle axle, a plunger within the cylindrical member, a compression spring between the tubular piston and plunger, and a strap secured to the plunger and extending about the vehicle axle.

2. In a shock absorber for use between a vehicle frame and axle, a bracket secured to the vehicle frame, a tubular member secured to the bracket, a tubular piston reciprocably mounted within the tubular member, a foot at the lower end of the tubular piston adapted to be engaged by the axle upon upward movement thereof, a coiled spring supported on the upper end of the tubular piston, a plunger fitting the inner wall of the tubular member and supported on the said spring, a strap secured to the plunger extending through the tubular piston and beneath the vehicle axle, the relationship being such that upon either upward or downward movement of the axle the spring is compressed.

3. In a shock absorber positioned between a vehicle frame and axle, a bracket secured to the vehicle frame and having a depending tubular member formed integrally therewith, a piston reciprocably mounted in the tubular member provided with a foot at the lower end adapted to be engaged by the axle upon upward movement thereof, a plunger in the upper end of the tubular member, a compression member between the plunger and the piston head, and a strap secured to the plunger and extending beneath the axle and adapted to be engaged upon downward movement thereof.

4. In a shock absorber for use between a vehicle frame and axle, a bracket secured to the vehicle frame, a tubular member secured to the said bracket, a tubular piston reciprocably mounted therein, a spring supported on the tubular piston, a plunger supported by the said spring, a strap secured to the said plunger and extending about the vehicle axle, and a foot on the tubular piston adapted to engage the axle on upward movement thereof.

5. In a shock absorber for use between a vehicle frame and axle thereof, a bracket secured to the frame and provided with a depending tubular member, a tubular piston reciprocably mounted in the said member and having a foot at the lower end normally positioned above the axle, a plunger reciprocable in the tubular member, a coiled spring between the plunger and piston resisting movement of either, and a strap attached to the plunger and extending about the axle normally in spaced relation therebelow.

6. The combination with a vehicle body, an axle and a spring member supporting the body on the axle, of a shock absorber secured to the body and provided with a portion extending beneath the axle and normally spaced therefrom and a portion above the axle similarly spaced therefrom, and a spring member resisting relative movement of the body and and axle upon engagement of either of said portions with the axle.

In testimony whereof, I sign this specification.

GEORGE H. TRIPPLEHORN.